Patented Feb. 21, 1939

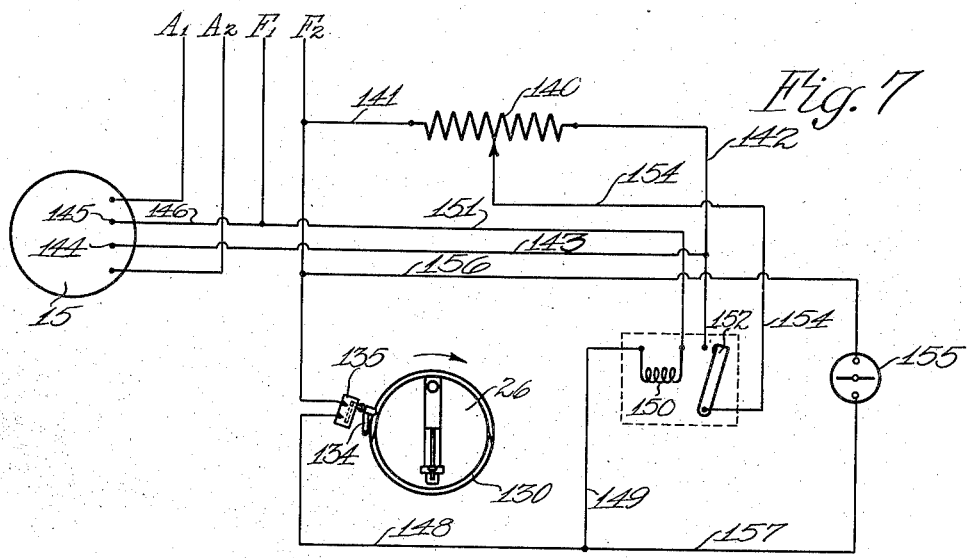
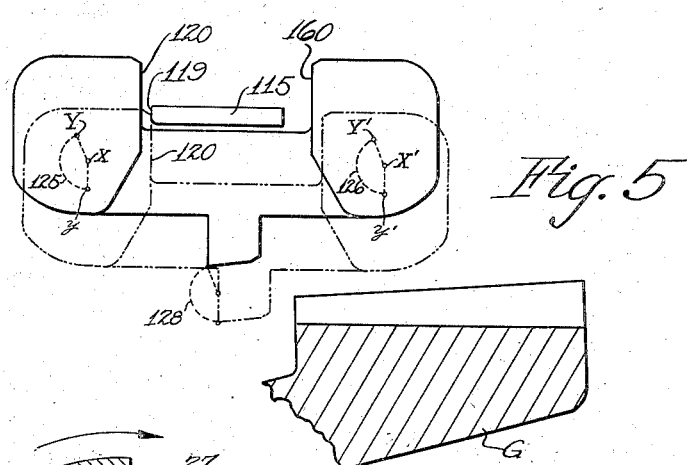
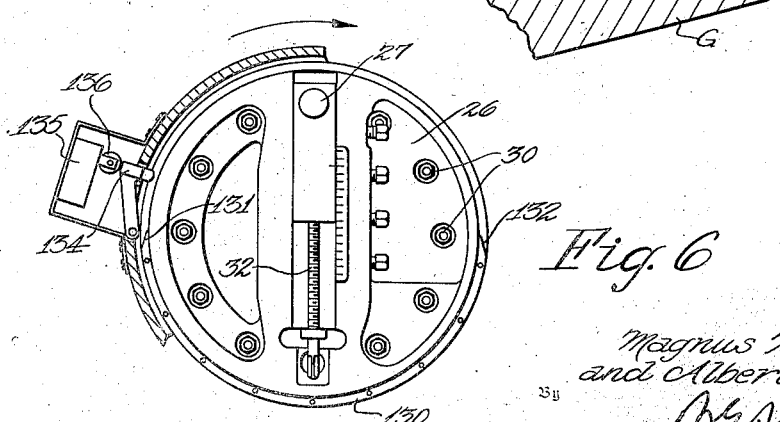

2,148,072

UNITED STATES PATENT OFFICE 2,148,072

TOOL MECHANISM FOR GEAR CUTTING MACHINES

Magnus H. Johanson, Rochester, and Albert E. Clark, Fairport, N. Y., assignors to Gleason Works, Rochester, N. Y., a corporation of New York Application September 25, 1936, Serial No. 102,550

6 Claims. (Cl. 90—55)

The present invention relates to tool mechanism for gear cutting machines and more particularly to tool mechanism of the reciprocating type in which the tool cuts on its stroke in one direction and is withdrawn from cutting position on its return stroke.

One of the objects of the invention is to provide means for quickly and positively moving a reciprocating tool to and from cutting position at opposite ends of its strokes which will be simple in operation, sturdy in construction, compact, and hold the tool rigidly during cutting.

Another object of the invention is to provide a mechanism for reciprocating a tool at a varying velocity so that the return stroke of the tool may be at a faster rate than its cutting stroke in order thereby to reduce the idle time of the machine.

Other objects of the invention will be apparent hereinafter from the specification and from the recital of the appended claims.

In the drawings:

Figure 5 is a diagrammatic view illustrating the operation of the improved tool head;

Figure 6 is a side elevation of the crank-plate for imparting the reciprocating movement to the tool and showing the mechanism for controlling the speed of movement of the tool; and Figure 7 is a wiring diagram showing the wiring of the motor which drives the crank-plate and actuates the tool mechanism.

The invention is shown as applied to a machine of the type described in the U. S. Patent to Candee and Johanson, No. 1,616,439, of February 8, 1927. Here the blank has a continuous indexing rotation and the tool is fully relieved from engagement with the blank at the end of each cutting stroke so that the blank may be indexed through its continuous rotation on the return stroke of the tool without interference with the tool. The invention may be applied, however, also to machines operating on the intermittent indexing principle where only a slight relieving movement need be imparted to the tool at the end of the cutting stroke and where the blank is not indexed until a tooth or tooth space has been completely cut.

In the embodiment of the invention shown, the tool is mounted upon a clapper block which is actuated to impart the relieving movements to the tool. The clapper block is mounted on the tool slide by means of a pair of cranks or eccentrics which are disposed, respectively, on either side of the tool so that when they are rotated at the ends of the strokes of the tool slide they impart a parallelogram motion to the tool to move it to or from cutting position depending upon the direction of their rotation. The tool slide is reciprocated by a crank driven from a variable speed motor and a cam is mounted on the face of the crank plate which operates a limit switch that controls the variable speed motor in such a way that at the end of each cutting stroke of the tool, the motor is speeded up to produce a quick return motion of the tool slide and thereby reduce the idle time of the machine to a minimum. The cranks or eccentrics for operating the clapper block may be actuated from a cam integral with the crank-plate in a manner similar to the clapper block actuating mechanism shown in the patent mentioned.

Figure 1:
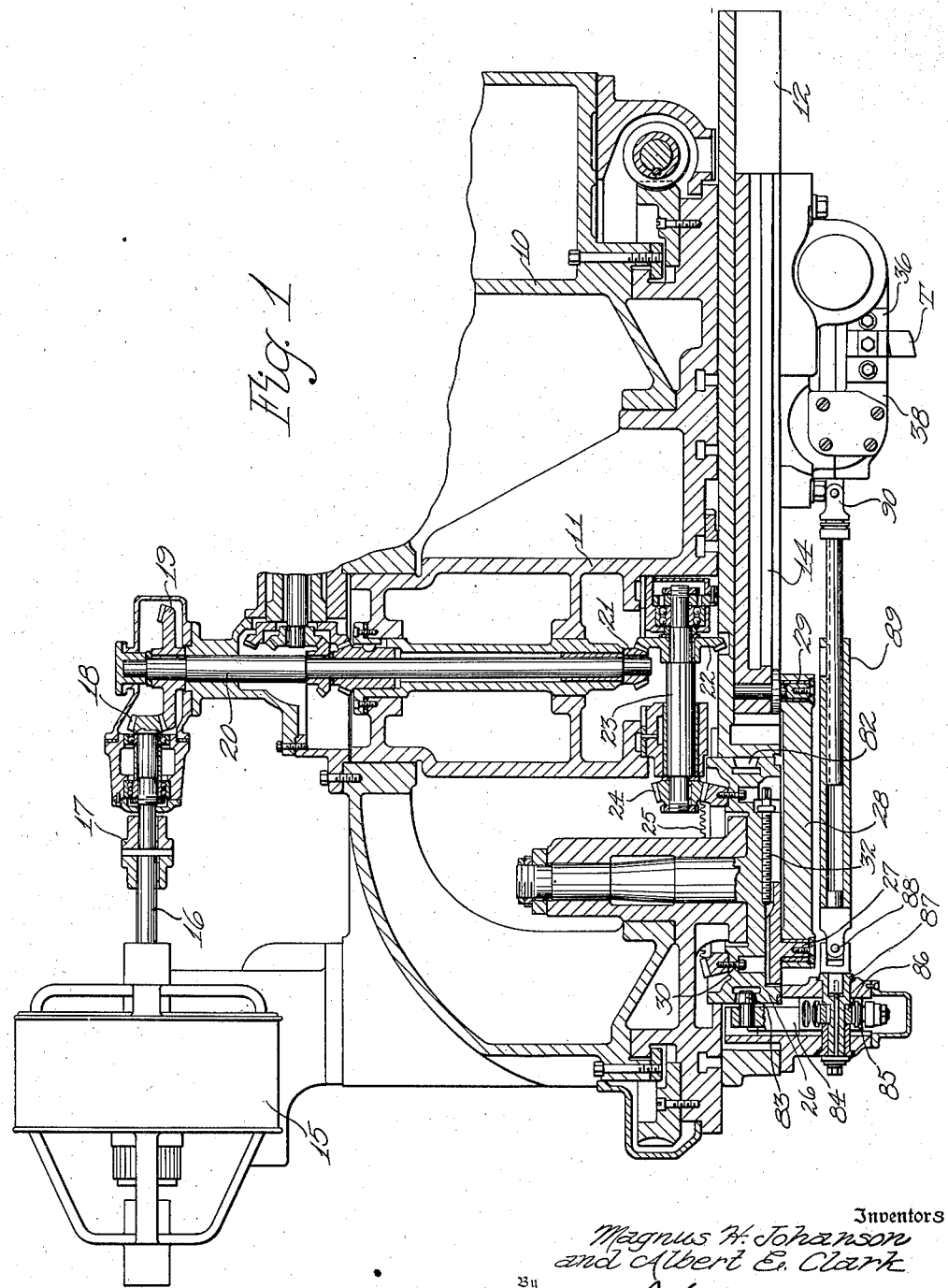
Figure 1 is a partial sectional view of a gear cutting machine of known type provided with a tool mechanism constructed according to a preferred embodiment of the present invention.

Referring to the drawings by numerals of reference, 10 indicates the upright or frame of a gear cutting machine such as shown in the Candee et al. patent. 11 designates the cradle of the machine and 12 the guide or arm for supporting the tool mechanism. The tool slide is denoted at 14 (Figs. 1, 2 and 3) and is reciprocated through a crank mechanism to impart the cutting and return strokes to the tool.

The drive to the tool slide is from the variable speed motor 15 through the shaft 16, coupling 17, bevel gearing 18 and 19, shaft 20, bevel gearing 21 and 22, shaft 23, bevel gearing 24 and 25, crank-plate 26, crank-pin 27, connecting-rod 28, and pin 29. The bevel gear 25 is secured to the back of the crank-plate by screws 30 and the crank-pin 27 is adjustable on the face of the crank-plate in known manner by the screw 32.

The cutting tool itself is denoted at T. It is secured by the bolt 35 in a block 36 which is in turn adjustably fastened to the clapper-block 38 by T-bolts 39 which engage in the elongated T-slot 40 formed in the clapper block.

The clapper block 38 in mounted through anti-friction bearings 42 and 43, respectively, upon the pins 44 and 45, respectively, of crank members 46 and 47, respectively. The stud or shaft 48 of the crank member 46 is journaled through an anti-friction bearing 50 in the capped bearing 52 of the tool head 54.

Figure 2:
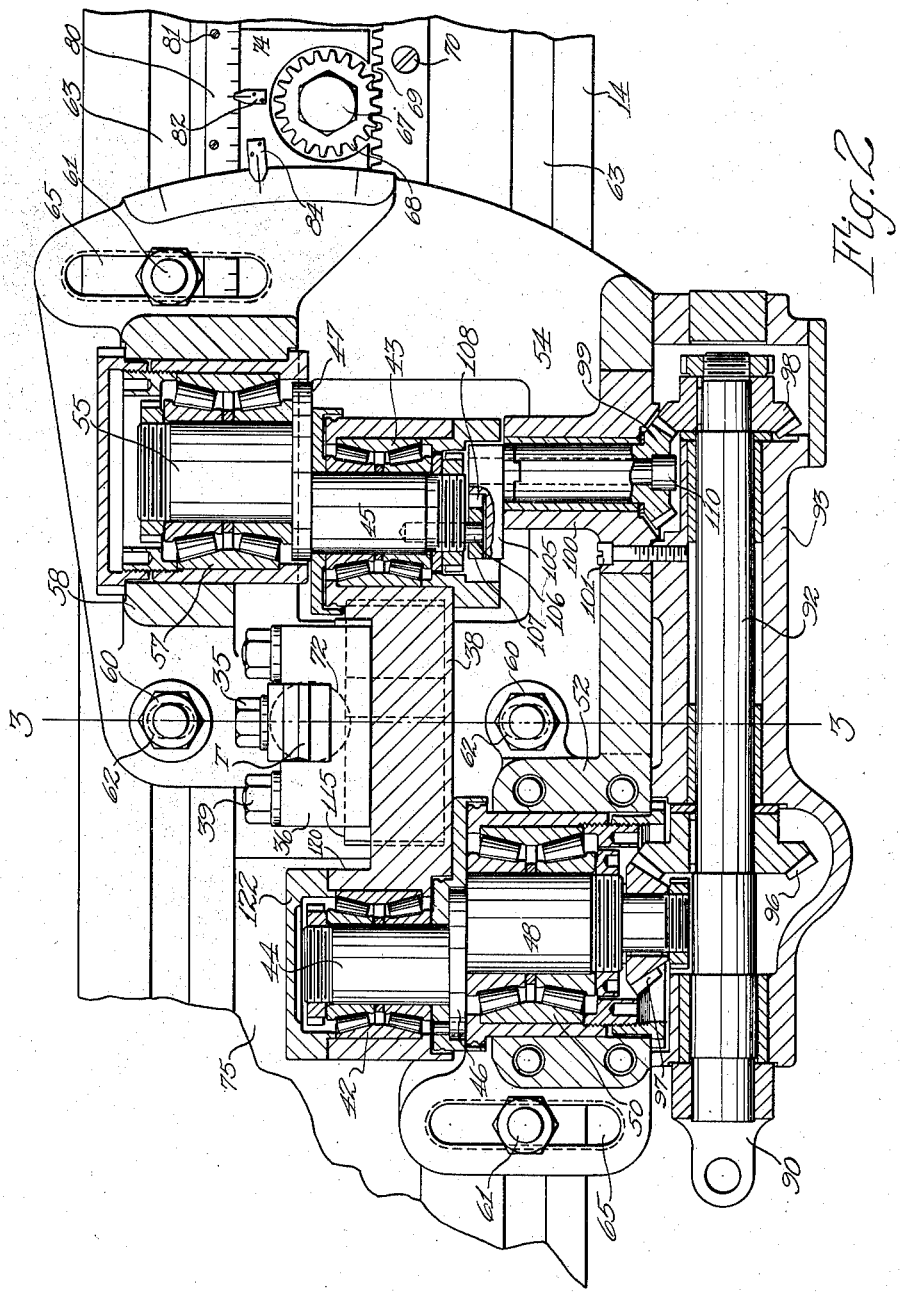
Figure 2 is a side elevation of the tool head of the machine, parts being shown in section.

The stud or pin 55 of the crank member 47 is journaled through the anti-friction bearing 57 in the bearing 58 which is integral with the tool head 54. The crank members 46 and 47 are inverted with reference to one another as shown in Fig. 2 and the bearings 52 and 58 for the shafts of these crank members are located below and above the clapper block, respectively. This construction provides the greatest rigidity in the tool mounting. The bearing 52 is a capped bearing for the sake of convenience in assembling the parts.

The tool head 54 is mounted on the tool slide 14 for lateral and angular adjustment thereon. It is secured to the tool slide 14 by T-bolts 60 and by T-bolts 61. The bolts 60 pass through slightly elongated openings 62 in the head 54 and engage in the T-slots 63 formed in the face of the tool slide 14. The bolts 61 pass through elongated slots 65 in the head 54 and engage also in the T-slots 63.

The tool head is adjusted on the tool slide, to position the tool in accordance with the cone distance of the gear to be cut, by loosening the bolts 60 and 61 and rotating the stub shaft 67 (Fig. 2). This shaft carries a spur pinion 68 which meshes with a rack 69 that is secured by screws 70 to the face of the tool slide 14.

Figure 3:
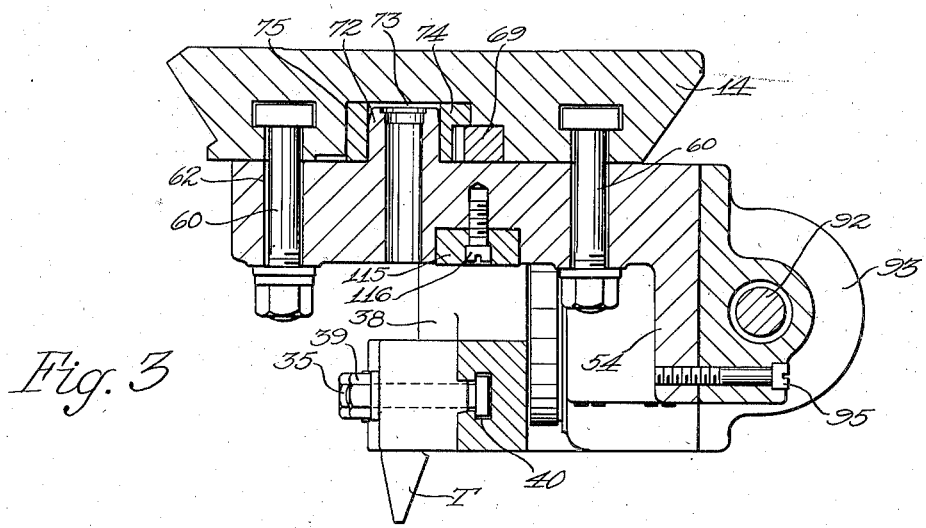
Figure 3 is a section through the tool head taken substantially on the line 3—3 of Fig. 2.

The tool is adjusted angularly for cutting clearance by adjustment of the tool head about the center of a projection or stud 72 (Fig. 3). This adjustment is made by hand after loosening the bolts 60 and 61. There is space enough between the stems of the bolts and the sides of the slots 62 and 65 to permit of this adjustment. The stud 72 is cylindrical and seats in a circular hole 73 in a plate 74 that is slidably mounted in a recess 75 formed in the face of the tool slide 14. The plate 74 is held in position on the tool slide by the rack 69 which acts as a gib therefor. The slidable mounting of the plate 74 permits of its movement with the tool head 54 in the lateral adjustment of the latter upon the tool slide 14.

The lateral adjustment of the tool head upon the slide can be made accurately by use of the scale 80 which is secured to the face of the slide by screws 81 and which reads against a pointer 82 that is secured to the plate 74 (Fig. 2). Angular adjustment of the tool head 54 can be made accurately by use of the scale inscribed on the face of the head at one side thereof, as shown in Fig 2, and which reads against the pointer 84 which is secured to the plate 74.

The crank members 46 and 47 are oscillated first in one direction and then in the other at the opposite ends, respectively, of the stroke of the tool slide to move the tool from and to cutting position. The mechanism for operating the crank members may be similar to that employed in the machine of the Candee et al. patent above mentioned for operating the clapper block oscillating mechanism shown in that patent. Such a mechanism is illustrated in the drawings of the present application.

The crank plate 26 is formed with a peripheral cam-groove 82. A cam roller 83 engages in this groove. The cam roller is secured to a bar 84 which carries a rack member 85. The rack member 85 meshes with a spur pinion 86 that is keyed to a rotary member 87 which is connected by a universal joint 88 with a telescoping shaft 89. The telescoping shaft is connected by a universal joint 90 with a shaft 92 that is suitably journaled in a bracket 93 which is secured by screws 95 (Figs. 2 and 3) to the under face of the tool head 54.

A bevel gear 96 which is keyed to the shaft 92 meshes with a bevel gear 97 which is keyed to the shaft 48 of the crank member 46 so that the crank member 46 is oscillated upon oscillation of the telescoping shaft 89. Likewise there is a bevel gear 98 keyed to the shaft 92 to mesh with a bevel gear 99 which is journaled on a suitable bearing in a supporting member 100 which is secured by screws 101 to the bracket 93.

The bevel gear 99 is adapted to be connected to a crank-plate 105 (Fig. 2). The crank-plate 105 is connected to the shaft 45 of the crank member 47 by a pin 106 and block 107, the latter being slidable in a slot 108 formed in the face of the crank plate 105.

The opposed faces of the crank plate and of the sleeve portion of the bevel gear 99 are formed with interengaging clutch teeth and the crank-plate 105 and bevel gear 99 may be rigidly connected together by drawing up the bolt 110. The clutch connection between the crank-plate 105 and the bevel gear 99 permits of adjusting the crank member 47 angularly so that the crank pin 45 may occupy the same relative angular position with reference to the crank member 47 as does the crank pin 44 with reference to its crank member 46, whereby the desired parallelogram motion may be imparted to the clapper block.

The crank members 46 and 47 are preferably so adjusted and mounted in the tool head 54 that the crank pins 44 and 45 extend at right angles to the tool head and tool slide when the tool is in cutting position. This minimizes any tendency of the cutting thrust on the tool to move the tool from cutting position. In addition, a positive stop is provided to securely hold the tool in cutting position against any cutting thrust. This comprises a block 115 which is secured to the front face of the tool head 54 by the screws 116 (Fig. 4) and the gib 117. The latter is secured to the tool head 54 by the screw 118.

Figure 4:
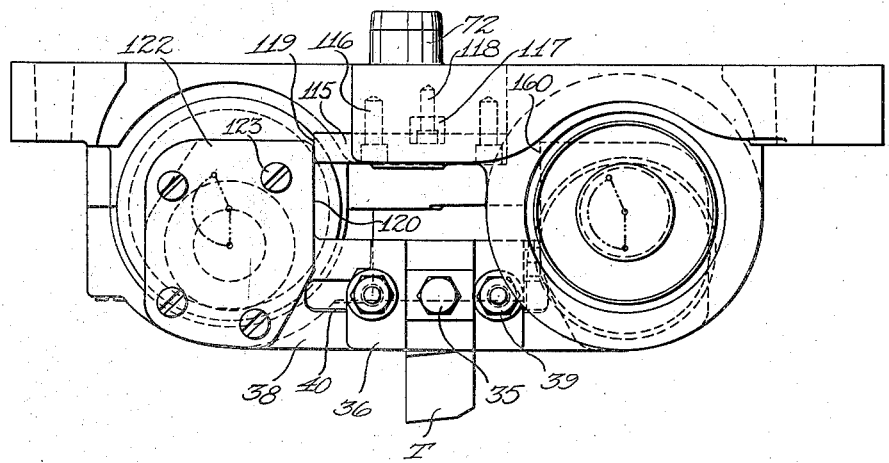
Figure 4 is a plan view of the tool head, showing the tool in cutting position.

The block 115 has a plane side surface 119 at one end which is adapted to engage the slabbed-off plane surface 120 of the clapper-block when the tool is in cutting position as shown in Fig. 4, so that the cutting thrust of the tool may be taken by the block 115. The surface 120 is formed on one side of the bearing formed on the clapper block for the anti-friction bearing 42 and the crank-pin 44. The cap-member 122 for this bearing is shaped as clearly shown in Fig. 4 to conform to the shape of the bearing itself. It is secured to the bearing portion of the clapper block by screws 123.

The cam-track 82 in the crank-plate 26 is so formed that at the end of the cutting stroke of the tool, the crank members 46 and 47 are rotated in a direction to move the clapper block rearwardly away from the blank to withdraw the tool from cutting position. The tool is held in withdrawn position on the return stroke. At the end of the return stroke, the crank members 46 and 47 are again actuated and rotated back to original position to return the tool to cutting position.

The movements of the clapper block are illustrated diagrammatically in Fig. 5. The dotted lines indicate the position of the clapper block at the end of a cutting stroke of the tool. The full lines show the position of the clapper block after the crank members 46 and 47 have been rotated to move the tool from cutting position prior to the return stroke. $x$ and $x'$ indicate the centers of the shafts 48 and 55. y and y' indicate the centers of the crank pins 44 and 45 when the clapper block is in cutting position. Y and Y' indicate the positions of the centers of the crank pins 44 and 55 when the clapper block is in withdrawn position. The arcs 125 and 126 denote the arcs of travel of the centers of the crank pins 44 and 55 in the movement of the clapper block.

The path of a point of the cutting tool in the movement of the tool from cutting to withdrawn position is denoted by the arc 128 (Fig. 5). It will be noted that the slabbed-off plane surface 120 of the clapper block seats against the end face 119 of the block 115 in cutting position so that the block 115 may take the cutting thrust on the tool, as above described, but that in the withdrawn position, the surface 120 is clear of the block 115.

For gears of large sizes and long face width, it is especially desirable to speed up as much as possible the idle return movement of the tool so as to minimize as far as possible the idle time of the machine. To this end, we employ a variable speed motor, as stated, for driving the tool crank and provide means for controlling this motor so that while it operates at the necessary slow speed during cutting, it may function at high speed as soon as each cutting stroke is completed to produce a high speed return stroke of the tool.

The control mechanism for the motor includes an arcuate cam-plate 130 (Fig. 6) which is secured to the face of the crank-plate 26 and extends through an arc of 180°. The cam-plate is formed with beveled end surfaces 131 and 132.

The cam-plate 130 is adapted to cooperate with a pivoted trip arm 134 that operates a limit-switch 135 through contact with the roller 136 of this switch.

The limit-switch 135 is adapted to control the field rheostat of the drive motor 15 as illustrated diagrammatically in Fig. 7.

A1 and A2 denote the main lines to the armature of the motor and F1 and F2, the main lines of the field of the motor. The field rheostat is denoted at 140.

During cutting, the full resistance of the rheostat is used and the field circuit of the motor is from the main line F2 through the line 141, the rheostat 140, the line 142, line 143, terminal 144 of the motor, terminal 145 of the motor and line 146 back to the main line F1. The crank plate 26 is rotating in the direction of the arrow (Figs. 6 and 7) and at the end of the cutting stroke of the tool, the tip of the arm 134 will ride up on the cam 130, closing the limit-switch 135. This will close a circuit from the main line F2 through the limit switch 135, the line 148, the line 149, the coil 150, and line 151 to the main line F1. This will energize the coil 150 and cause it to close the switch arm 152 of the motor controller. The field circuit of the motor 15 is thus caused to extend from the main line F2 through the line 141, a limited number of coils of the rheostat 140 as determined by the setting of the rheostat, the line 154, the switch arm 152 and the line 143, the terminals 144 and 145 of the motor 15, and the line 146 to the main line F1. Thus, the motor will rotate at higher speed, the speed being determined by the setting of the rheostat, and the crank plate 26 will be driven at higher speed for the return movement of the tool. At the end of the return movement of the tool, the arm 134 will drop off of the cam 130 so that the tool slide will again be driven at slow speed for the cutting movement of the tool.

For gears of short face-width, the speed control mechanism may be rendered inoperative by closing the switch 155. This serves to cut the coil 150 out of the circuit when the limit-switch 135 is closed, for current will flow from the line F2 through the line 156, switch 155, lines 157 and 148 and switch 135 back to line F2 rather than through the coil 150.

In the drawings the tool has been shown as cutting from the outer to the inner ends of the teeth of the blank. For cutting in the reverse direction, the tool is reversed on the tool block and the stop-plate 115 is reversed so that the side 119 of the block will abut against the slabbed-off surface 160 of the clapper block to hold the tool against cutting thrusts. The drive to the telescoping shaft 89 from the cam 82 is also reversed as described in Patent No. 1,616,439 so that the tool is moved in the proper direction, to or from cutting position at the ends of its stroke.

While the invention has been described in connection with a machine of a particular type, it will be understood, as previously stated, that the invention is capable of wide use and this application is intended to cover any variations, uses, or adaptations of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described our invention what we claim is:

1. In a machine for producing gears, a frame, a slide, a support, a cutting tool mounted on one of said parts, a pair of parallel swinging arms, each connected at one end to the support and at its opposite end to one of the two first named parts, means for reciprocating said slide to impart cutting and return movements to the tool, and means for simultaneously imparting motion to the two arms at opposite ends of the stroke of the slide to move the tool to and from cutting position.

2. In a machine for producing gears, a slide, a clapper block, a tool secured to the clapper block, a pair of parallel swinging arms, each connected at one end to the clapper block and at its opposite end to the slide, means for reciprocating the slide to impart cutting and return movements to the tool, and means for simultaneously imparting swinging motion to the two arms at opposite ends of the stroke of the slide to move the tool to and from cutting position.

3. In a machine for producing gears, a slide, a clapper block, a tool secured to the clapper block, a pair of cranks journaled in the slide and having their pins secured to the clapper block, means for reciprocating the slide to impart cutting and return movements to the tool, and means for oscillating said cranks in opposite directions, respectively, at opposite ends of the stroke of the slide to move the tool to and from cutting position.

4. In a machine for producing gears, a slide, a tool block, a tool secured to said block, a pair of parallel arms, each pivotally connected at one end to the slide and each pivotally connected at its opposite end to the tool block with the pivotal connections of the two arms to the slide being disposed at opposite sides of the path of cutting travel of the tool, means for reciprocating said slide to impart cutting and return movements to the tool, and means for simultaneously swinging the arms in opposite directions at opposite ends, respectively, of the stroke of the slide to move the tool to and from cutting position.

5. In a machine for producing gears, a slide, a tool block, a tool secured to the block, a pair of parallel arms, each pivotally conected at one end to the slide and each pivotally connected at its opposite end to the tool block, means including a rotary crank for reciprocating the slide to impart cutting and return movements to the tool, and means actuated on rotation of the crank for simultaneously oscillating said arms in opposite directions at opposite ends, respectively, of the stroke of the slide to move the tool to and from cutting position.

6. In a machine for producing gears, a slide, a tool block, a tool secured to said block, a pair of parallel arms, each pivotally connected at one end to the slide and each pivotally connected at its opposite end to the tool block, means including a rotary crank for reciprocating the slide to impart cutting and return movements to the tool, and a cam secured to the crank and operatively connected to the arms to oscillate the arms on rotation of the crank in opposite directions at opposite ends, respectively, of the stroke of the slide to move the tool to and from cutting position.

MAGNUS H. JOHANSON.
ALBERT E. CLARK.